United States Patent
Ishiguro et al.

(10) Patent No.: US 8,916,631 B2
(45) Date of Patent: Dec. 23, 2014

(54) FLAME-RETARDANT POLY LACTIC ACID-CONTAINING FILM OR SHEET, AND METHOD FOR MANUFACTURING THEREOF

(75) Inventors: Shigeki Ishiguro, Ibaraki (JP); Hiroki Senda, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 315 days.

(21) Appl. No.: 13/256,306

(22) PCT Filed: Jan. 7, 2011

(86) PCT No.: PCT/JP2011/050163
§ 371 (c)(1),
(2), (4) Date: Sep. 13, 2011

(87) PCT Pub. No.: WO2011/083838
PCT Pub. Date: Jul. 14, 2011

(65) Prior Publication Data
US 2012/0003459 A1 Jan. 5, 2012

(30) Foreign Application Priority Data
Jan. 8, 2010 (JP) .................. 2010-003361

(51) Int. Cl.
| C08L 67/04 | (2006.01) |
| C08L 27/18 | (2006.01) |
| C08K 5/51 | (2006.01) |
| C08K 5/521 | (2006.01) |
| C08K 5/523 | (2006.01) |
| C08J 5/18 | (2006.01) |
| B29C 43/24 | (2006.01) |
| C08L 51/06 | (2006.01) |
| B29C 47/88 | (2006.01) |
| B29L 7/00 | (2006.01) |
| C08G 63/06 | (2006.01) |
| C08G 63/60 | (2006.01) |
| B29C 47/00 | (2006.01) |

(52) U.S. Cl.
CPC .. C08J 5/18 (2013.01); *C08L 51/06* (2013.01); *C08J 2367/04* (2013.01); *B29C 47/8845* (2013.01); *B29L 2007/008* (2013.01); *C08L 2201/02* (2013.01); *C08G 63/06* (2013.01); C08L 67/04 (2013.01); *C08G 63/60* (2013.01); *C08K 5/523* (2013.01); B29C 43/24 (2013.01); *B29C 47/0021* (2013.01); *B29K 2995/006* (2013.01); *C08K 5/521* (2013.01); *C08L 27/18* (2013.01); *C08K 5/51* (2013.01)
USPC .......... 524/127; 525/185; 524/151; 524/546; 524/544; 524/556; 524/557; 524/599; 524/280

(58) Field of Classification Search
CPC .... C08G 63/06; C08G 63/60; C08G 2170/40; C08K 5/521; C08K 5/523; C08K 5/51; B29C 43/24; B29C 47/0021; B29C 47/8845; B29K 2995/006; B29L 2007/008; C08J 5/18; C08J 2367/04; C08L 2201/02; C08L 27/18; C08L 51/06; C08L 2666/02
USPC ......... 524/280, 599, 151, 546, 544, 556, 557; 525/185
See application file for complete search history.

(56) References Cited

U.S. PATENT DOCUMENTS

2008/0262151 A1* 10/2008 Ishii et al. ............. 524/599

FOREIGN PATENT DOCUMENTS

| EP | 2345691 | 7/2001 |
| EP | 1985659 A1 * | 10/2008 |
| JP | 3330712 | 7/2002 |
| JP | 2006-182994 | 7/2006 |
| JP | 2007-056247 | 3/2007 |
| JP | 2007-130894 | 5/2007 |
| JP | 2007-308660 | 11/2007 |
| JP | 2008-303320 | 12/2008 |
| WO | 2010/038833 | 4/2010 |

OTHER PUBLICATIONS

U.S. Appl. No. 13/260,780 to Hiroki Senda et al., which was filed Sep. 28, 2011.

U.S. Appl. No. 13/266,275 to Hiroki Senda et al., which was filed Oct. 26, 2011.
U.S. Appl. No. 13/266,296 to Shigeki Ishiguro et al., which was filed Oct. 26, 2011.
Search report from International Application No. PCT/JP2011/050163, mail date is Mar. 29, 2011.
Inoue, "Modified Low Molecular Weight Polyolefin Based Modifier," from San' yo Kasei News 2005 and English translation.
Notification of First Office Action issued in Chinese patent application CN201180001492.0 on Jun. 18, 2013.
Notification of Second Office Action dated Jan. 26, 2014 in CN201180001492.0 and English translation thereof.

\* cited by examiner

*Primary Examiner* — Ling Choi
*Assistant Examiner* — David L Miller
(74) *Attorney, Agent, or Firm* — Greenblum & Bernstein, P.L.C.

(57) ABSTRACT

Provided is a film or sheet composed of a resin composition that includes a poly lactic acid (A), an acidic functional group-modified olefinic polymer (B) including an acidic functional group and having an acid value of 10 to 70 mg KOH/g and a weight average molecular weight of 10,000 to 80,000, a tetrafluoroethylene polymer (C), and an aromatic-condensed phosphoric acid ester-containing flame retardant (D) including a compound of General Formula (I) and in which the aromatic-condensed phosphoric acid ester-containing flame retardant (D) is included in an amount of 10 to 80 parts by weight based on 100 parts by weight of the poly lactic acid (A), and a method for manufacturing the film or sheet by melt film formation. Each sign in Formula is as described in the specification.

[Formula 1]

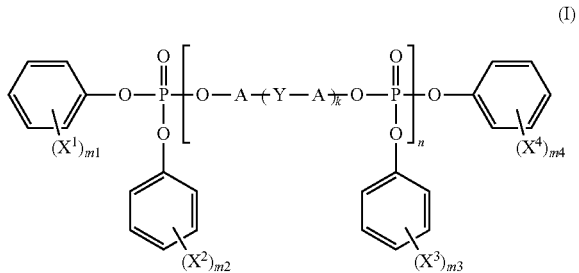

11 Claims, 1 Drawing Sheet

FLAME-RETARDANT POLY LACTIC ACID-CONTAINING FILM OR SHEET, AND METHOD FOR MANUFACTURING THEREOF

TECHNICAL FIELD

The present invention relates to flame-retardant poly lactic acid-containing films or sheets that have excellent flame retardancy, heat resistance, mechanical properties (for example, breaking strength and tear strength), and roll lubricity.

BACKGROUND ART

A poly lactic acid resin is a biomass polymer and therefore has been drawing attention in recent years in the context of the depletion of petroleum resources, the reduction of carbon dioxide emissions, and the like.

However, poly lactic acid itself is readily burned and thus difficult to be used for members that require flame retardancy, such as electrical and electronic applications. In addition, the poly lactic acid has a low crystallization rate and is unlikely to be crystallized by a common film forming procedure. Thus, a film composed of a resin composition containing the poly lactic acid has a problem of poor heat resistance. For example, such a film is thermally deformed at about 60° C. or more that is a glass transition temperature of the poly lactic acid and cannot keep a film shape.

For providing desired flame retardancy and heat resistance to the poly lactic acid resin, the following methods and the like have been developed.

For example, there has been developed a method of providing the flame retardancy and heat resistance by the addition of a phosphorus-containing or nitrogen-containing flame retardant into a mixture of a poly lactic acid resin and a heat resistant polymer such as a polycarbonate resin (Patent Documents 1 and 2). There has been also developed a method of providing the flame retardancy and heat resistance by heat treating, at a particular temperature, a resin composition that is obtained by the addition of a flame retardant to a mixture of a poly lactic acid resin and an amorphous resin or a low-crystalline resin, during or after injection molding to highly crystallize the poly lactic acid resin (Patent Document 3).

However, either method does not provide sufficient effect on the problem when it is used for a film or sheet. In particular, there has been developed no method that can be applied to a thin film having a thickness of less than 200 μm until now.

Commonly, the smaller thickness a film or sheet has, the more difficult it is to satisfy a standard for flame retardancy (for example, UL-94 VTM standards). To address this, a flame retardant is mixed in a larger amount. However, the flame retardant is a foreign matter to the poly lactic acid resin, and thus such a poly lactic acid resin has a problem of the reduction of the breaking strength or tear strength.

There is another problem. That is, when a resin composition containing the poly lactic acid is melted to form a film or sheet using metal rolls, the resin composition adheres to the metal rolls to interfere with the formation of the film or sheet because the resin composition has a poor releasability from the rolls.

For the heat resistance, there were reported methods for providing the heat resistance by accelerating the crystallization of the poly lactic acid resin by the following methods.

For example, there has been developed a method in which the poly lactic acid resin is subjected to, for example, melt extrusion to form a sheet and the sheet is biaxially stretched to accelerate stretching oriented crystallization (Patent Document 4). However, this method has a disadvantage that a high operating temperature largely increases heat shrink due to internal stress during the stretching. Hence, the actual operating temperature is at highest about 100° C.

A method of crystallization by the addition of a crystal nucleating agent also has a problem. That is, in common film formation, a film is cooled to a glass transition temperature or less immediately after the melt film formation in order to keep the film shape, while the film has a small thickness. Thus, the cooling rate is increased and the advantageous effect of the crystal nucleating agent is unlikely to be achieved. To address the problem, it has been developed that a heating step at 60 to 100° C. is arranged for accelerating the crystallization after the film formation step (Patent Document 5). However, this method is inefficient because a film is once cooled and solidified, and then heated again.

CITATION LIST

Patent Literature

Patent Document 1: Japanese Unexamined Patent Application No. 2006-182994

Patent Document 2: Japanese Unexamined Patent Application No. 2008-303320

Patent Document 3: Japanese Unexamined Patent Application No. 2007-308660

Patent Document 4: Japanese Patent No. 3330712

Patent Document 5: Japanese Unexamined Patent Application No. 2007-130894

SUMMARY OF INVENTION

Technical Problem

An object of the present invention is to provide a poly lactic acid-containing film or sheet having excellent flame retardancy, heat resistance, and roll lubricity while maintaining the original mechanical properties (for example, breaking strength and tear strength) of a poly lactic acid resin and a method for manufacturing the film and sheet.

Solution to Problem

The present inventors have carried out intensive studies to solve the problems, and as a result, the invention has been accomplished. The present invention is as described below.

[1] A film or sheet (hereinafter, also referred to as a film or sheet of the present invention) composed of a resin composition (hereinafter, also referred to as a poly lactic acid (A)-containing resin composition) includes a poly lactic acid (A), an acidic functional group-modified olefinic polymer (B) that includes an acidic functional group and has an acid value of 10 to 70 mg KOH/g and a weight average molecular weight of 10,000 to 80,000, a tetrafluoroethylene polymer (C), and an aromatic-condensed phosphoric acid ester-containing flame retardant (D) that includes a compound of General Formula (I). The aromatic-condensed phosphoric acid ester-containing flame retardant (D) is included in an amount of 10 to 80 parts by weight based on 100 parts by weight of the poly lactic acid (A).

[Formula 1]

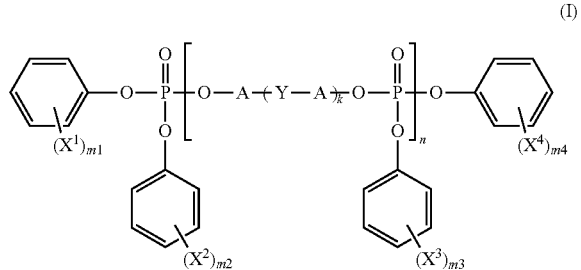

(I)

(where each A is independently an arylene group having 6 to 18 carbon atoms optionally further substituted with 1 to 3 alkyl groups having 1 to 6 carbon atoms; each Y is independently a single bond or an alkylene group having 1 to 6 carbon atoms; each of $X^1$ to $X^4$ is independently an alkyl group having 1 to 14 carbon atoms, an aryl group having 6 to 18 carbon atoms, an alkoxy group having 1 to 8 carbon atoms, or an aryloxy group having 6 to 18 carbon atoms; k is an integer of 0 to 2; each of m1 to m4 is independently an integer of 0 to 4; and n is an integer of 1 to 5)

[2] In the film or sheet according to the aspect [1], the acidic functional group included in the acidic functional group-modified olefinic polymer (B) is a carboxylic acid anhydride group.

[3] In the film or sheet according to the aspect [1] or [2], the tetrafluoroethylene polymer (C) is included in an amount of 0.5 to 15.0 parts by weight based on 100 parts by weight of the poly lactic acid (A).

[4] In the film or sheet according to any one of the aspects [1] to [3], the acidic functional group-modified olefinic polymer (B) is included in an amount of 0.1 to 10.0 parts by weight based on 100 parts by weight of the poly lactic acid (A).

[5] In the film or sheet according to any one of the aspects [1] to [4], the resin composition further includes a crystallization accelerator (E), and the crystallization accelerator (E) is included in an amount of 0.1 to 5.0 parts by weight based on 100 parts by weight of the poly lactic acid (A).

[6] The film or sheet according to any one of the aspects [1] to [5] has a thickness of 10 to 500 μm, satisfies a flame-retardant standard of UL94 VTM-0, and has a tear strength of 2.7 N/mm or more.

[7] The film or sheet according to any one of the aspects [1] to [6] has a deformation rate of 40% or less under a load of 10 N for 30 minutes in a temperature environment of 150° C. in accordance with heat deformation test in Japanese Industrial Standard C3005, and has a relative crystallization rate of 50% or more calculated from Equation (1)

Relative crystallization rate (%)=(ΔHm−ΔHc)/ΔHm× 100    (1)

(where ΔHc is an amount of heat of an exothermic peak associated with crystallization of the film or sheet in a temperature rise process after film formation, and ΔHm is an amount of heat associated with melting).

[8] A method for manufacturing the film or sheet according to any one of the aspects [1] to [7] includes forming a film from a resin composition by melt film formation. In the method, the resin composition during the melt film formation has a temperature between a temperature 15° C. higher than a crystallization temperature (Tc) of the resin composition in a temperature drop process and a temperature 5° C. lower than a melting temperature (Tm) in a temperature rise process, or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc).

[9] A method for manufacturing the film or sheet according to any one of the aspects [1] to [7] includes forming a film from a resin composition by melt film formation. In the method, the resin composition during the melt film formation has a temperature between a temperature 15° C. higher than a crystallization temperature (Tc) of the resin composition in a temperature drop process and a temperature 5° C. lower than a melting temperature (Tm) in a temperature rise process, and the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc).

[10] In the method for manufacturing the film or sheet according to the aspect [8] or [9], the melt film formation is a technique of forming a film having a desired thickness by passing the melted resin composition through a space between two metal rolls.

[11] In the method for manufacturing the film or sheet according to any one of the aspects [8] to [10], the crystallization accelerating step is characterized by bringing the melt film formed resin composition into contact with a metal roll having a predetermined surface temperature.

Advantageous Effects of Invention

According to the present invention, a poly lactic acid-containing film or sheet having excellent flame retardancy, heat resistance, and roll lubricity can be provided while maintaining the original mechanical properties (for example, breaking strength and tear strength) of poly lactic acid.

DESCRIPTION OF EMBODIMENTS

Figure 1:
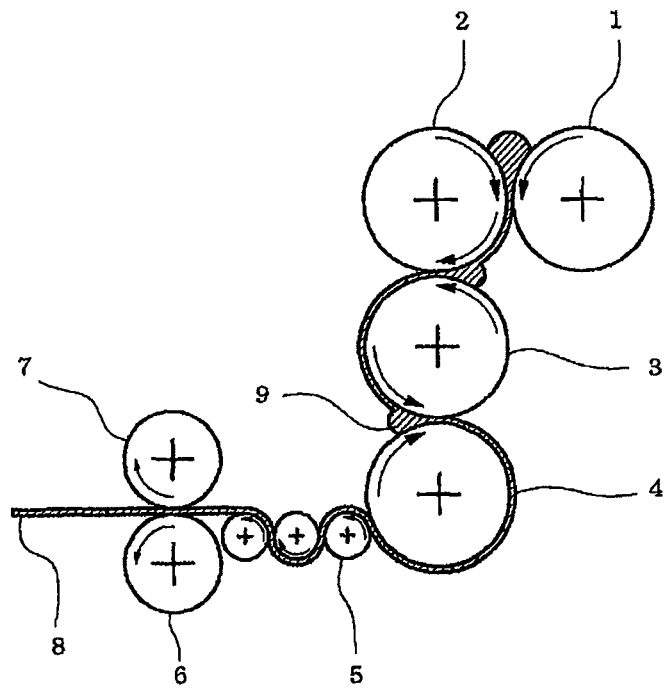
FIG. 1 is a schematic view of a calender film formation machine.

Hereinafter, the present invention will be described in detail.

The film or sheet of the present invention is composed of a resin composition that includes a poly lactic acid (A), an acidic functional group-modified olefinic polymer (B), a tetrafluoroethylene polymer (C), and an aromatic-condensed phosphoric acid ester-containing flame retardant (D). The film or sheet of the present invention includes a transparent film or sheet, a translucent film or sheet, and an opaque film or sheet.

The thickness of the film or sheet of the present invention is not necessarily limited, but is commonly 10 to 500 μm, preferably 20 to 400 μm, and more preferably, 30 to 300 μm.

[Poly lactic Acid (A)]

Lactic acid that is a material monomer of the poly lactic acid includes L- and D-optical isomers due to its asymmetric carbon atom. The poly lactic acid (A) used in the present invention is a polymer mainly composed of L-lactic acid. A polymer containing a smaller amount of D-lactic acid as an impurity during the manufacture has a higher crystallinity and a higher melting point. Hence, lactic acid to be used preferably has an L-lactic acid purity as high as possible, and the purity of L-lactic acid is more preferably 95% or more. The poly lactic acid (A) used in the present invention may include other copolymerizable components in addition to the lactic acid. Examples of other monomer units include glycol compounds such as ethylene glycol, propylene glycol, butanediol, heptanediol, hexanediol, octanediol, nonanediol, decanediol, 1,4-cyclohexanedimethanol, neopentyl glycol, glycerin, pentaerythritol, bisphenol A, polyethylene glycol, polypropylene glycol, and polytetramethylene glycol; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenyl ether dicarboxylic acid, 5-sodium sulfoisophthalic acid, and 5-tetrabutylphosphonium isophthalic acid; hydroxycarboxylic acids such as glycolic acid, hydroxypropionic acid, hydroxybutyric acid, hydroxyvaleric acid, hydroxycaproic acid, and hydroxybenzoic acid; and lactones such as caprolactone, valerolactone, propiolactone, undecalactone, and 1,5-oxepan-2-one. The content of such an other copolymerizable component is preferably 0 to 30% by mol and more preferably 0 to 10% by mol based on the total monomer components.

The weight average molecular weight of the poly lactic acid (A) is, for example, 10,000 to 400,000, preferably 50,000 to 300,000, and more preferably 80,000 to 150,000. The melt flow rate of the poly lactic acid (A) at 190° C. under a load of 21.2 N [Japanese Industrial Standard K-7210 (test condition 4)] is, for example, 0.1 to 50 g/10 minutes, preferably 0.2 to 20 g/10 minutes, more preferably 0.5 to 10 g/10 minutes, and particularly preferably 1 to 7 g/10 minutes. The poly lactic acid (A) having a too high melt flow rate may form a film or sheet having poor mechanical characteristics and heat resistance. The poly lactic acid (A) having a too low melt flow rate may lead to a too high load during film formation.

In the specification, the "weight average molecular weight" means that determined by gel permeation chromatography (GPC) (in terms of polystyrene). Conditions for GPC are as described below.

Column: TSKgel SuperHZM-H/HZ2000/HZ1000
Column size: 4.6 mm ID×150 mm
Eluant: chloroform
Flow rate: 0.3 ml/min
Detector: RI
Column temperature: 40° C.
Injection volume: 10 μl The method for producing the poly lactic acid is not necessarily limited and typical examples of the production method include lactide method and direct polymerization method. The lactide method is as follows; lactic acid is heated and dehydrocondensed to give poly lactic acid having a low molecular weight; the poly lactic acid is heated and decomposed under reduced pressure to give lactide that is a cyclic dimer of lactic acid; and the lactide is ring-opening polymerized in the presence of a metal salt catalyst such as tin(II) octanoate to give poly lactic acid having a high molecular weight. The direct polymerization method is as follows; lactic acid is heated in a solvent such as diphenyl ether under reduced pressure to be polymerized while removing water in order to suppress hydrolysis to give poly lactic acid directly.

A commercial product may be used as the poly lactic acid (A). Examples of the commercial product include trade names "Lacea H-400" and "Lacea H-100" (manufactured by Mitsui Chemicals, Inc.) and trade names "TERRAMAC TP-4000" and "TERRAMAC TE-4000" (manufactured by UNITIKA LTD.). A poly lactic acid (A) produced by a known or common polymerization method (for example, emulsion polymerization and solution polymerization) may be also used.

[Acidic Functional Group-Modified Olefinic Polymer (B)]

The manufacture of the film or sheet of the present invention requires the film formation by passing the melted poly lactic acid (A)-containing resin composition through a space between metal rolls with, for example, a calender film formation machine. Thus, the resin composition must be readily removed from the metal roll surfaces. The acidic functional group-modified olefinic polymer (B) included in the film or sheet of the present invention works as a lubricant to give a desired roll lubricity to the poly lactic acid (A)-containing resin composition.

Examples of the acidic functional group of the acidic functional group-modified olefinic polymer (B) include a carboxyl group and groups derived from it. The group derived form the carboxyl group is chemically derived from the carboxyl group, and examples include a carboxylic acid anhydride group, an ester group, an amide group, an imide group, and a cyano group. The carboxylic acid anhydride group is preferred.

The acidic functional group-modified olefinic polymer (B) is obtained by, for example, graft polymerization of an unmodified polyolefin polymer with an unsaturated compound containing the "acidic functional group" (hereinafter, also abbreviated to an acidic functional group-containing unsaturated compound).

Examples of the unmodified polyolefin polymer include polymers including polyolefins such as high-density polyethylene, medium-density polyethylene, low-density polyethylene, polypropylene, polybutene, poly-4-methylpentene-1, a copolymer of ethylene and α-olefin, and a copolymer of propylene and α-olefin and oligomers of them; polyolefin elastomers such as ethylene-propylene rubber, ethylene-propylene-diene copolymer rubber, butyl rubber, butadiene rubber, a low-crystalline ethylene-propylene copolymer, a propylene-butene copolymer, an ethylene-vinyl ester copolymer, an ethylene-methyl (meth)acrylate copolymer, an ethylene-ethyl (meth)acrylate copolymer, an ethylene-maleic anhydride copolymer, a blend of polypropylene and ethylene-propylene rubber; and a mixture of two or more of them. Preferred are polypropylene, a copolymer of propylene and α-olefin, low-density polyethylene, and oligomers of them, and particularly preferred are polypropylene, a copolymer of propylene and α-olefin, and oligomers of them. Examples of the "oligomers" include compounds obtained from a corresponding polymer by thermal decomposition in accordance with molecular weight reduction method. Such oligomers can also be obtained by polymerization.

Examples of the acidic functional group-containing unsaturated compound include a carboxyl group-containing unsaturated compound and an unsaturated compound containing a group derived from a carboxyl group. Examples of the carboxyl group-containing unsaturated compound include maleic acid, itaconic acid, chloroitaconic acid, chloromaleic acid, citraconic acid, and (meth)acrylic acid. Examples of the unsaturated compound containing a group derived from a carboxyl group include carboxylic acid anhydride group-containing unsaturated compounds such as maleic anhydride, itaconic anhydride, chloroitaconic anhydride, chloromaleic anhydride, and citraconic anhydride; (meth)acrylic acid esters such as methyl (meth)acrylate, glycidyl (meth)acrylate, and 2-hydroxyethyl (meth)acrylate; and (meth) acrylamide, maleimide, and (meth)acrylonitrile. Preferred are carboxyl group-containing unsaturated compounds and carboxylic acid anhydride group-containing unsaturated compounds, more preferred are carboxylic acid anhydride group-containing unsaturated compounds, and maleic anhydride is even more preferred.

Importantly, the acidic functional group-modified olefinic polymer (B) has a weight average molecular weight of 10,000 to 80,000, preferably 15,000 to 70,000, and more preferably 20,000 to 60,000. The polymer having a weight average molecular weight of less than 10,000 may cause bleed out after the formation of the film or sheet, and the polymer having a weight average molecular weight of more than 80,000 leads to separation of the polymer from the poly lactic acid during roll kneading. Here, the bleed out means the phenomenon of bleeding of a low molecular weight component out to the surface of a film or sheet with time after the film or sheet formation. In the specification, the "weight average molecular weight" means that determined by gel permeation chromatography (GPC).

The acidic functional group in the acidic functional group-modified olefinic polymer (B) may be bonded to any position in the olefinic polymer. The modified ratio is not necessarily limited, but the acidic functional group-modified olefinic polymer (B) commonly has an acid value of 10 to 70 mg KOH/g and preferably 20 to 60 mg KOH/g. The polymer having an acid value of less than 10 mg KOH/g cannot improve the roll lubricity, and the polymer having an acid value of more than 70 mg KOH/g causes plate out to a roll. Here, the plate out to a roll means that adhering or depositing of a component contained in the resin composition, an oxidation, decomposition, combination, or degradation product of the component, or the like to a metal roll surface during the melt film formation of the resin composition using the metal roll. In the specification, the "acid value" means that determined by neutralization titration in accordance with Japanese Industrial Standard K0070-1992.

The acidic functional group-modified olefinic polymer (B) is obtained by reaction of the acidic functional group-containing unsaturated compound and the unmodified polyolefin polymer in the presence of an organic peroxide. The organic peroxide to be used may be an initiator that is commonly used for radical polymerization. Such reaction may be carried out by either solution process or melting process.

In the solution process, a mixture of the unmodified polyolefin polymer and the acidic functional group-containing unsaturated compound is dissolved in an organic solvent together with an organic peroxide, and the solution is heated to give the acidic functional group-modified olefinic polymer (B). The reaction temperature is preferably about 110 to 170° C.

In the melting process, a mixture of the unmodified polyolefin polymer and the acidic functional group-containing unsaturated compound is mixed with an organic peroxide, and the whole is melted and mixed for reaction to give the acidic functional group-modified olefinic polymer (B). The melt-mixing can be carried out with various mixers such as an extruder, a Brabender, a kneader, and a Banbury mixer, and the kneading temperature is commonly from a melting point of the unmodified polyolefin polymer to 300° C.

The acidic functional group-modified olefinic polymer (B) is preferably a maleic anhydride group-modified polypropylene. For the acidic functional group-modified olefinic polymer (B), commercial products may be used, and examples include "Umex 1010" (maleic anhydride group-modified polypropylene, acid value: 52 mg KOH/g, weight average molecular weight: 32,000, modified ratio: 10% by weight), "Umex 1001" (maleic anhydride group-modified polypropylene, acid value: 26 mg KOH/g, weight average molecular weight: 49,000, modified ratio: 5% by weight), and "Umex 2000" (maleic anhydride group-modified polyethylene, acid value: 30 mg KOH/g, weight average molecular weight: 20,000, modified ratio: 5% by weight), each manufactured by Sanyo Chemical Industries, Ltd.

The content of the acidic functional group-modified olefinic polymer (B) is not particularly limited and commonly 0.1 to 10.0 parts by weight based on 100 parts by weight of the poly lactic acid (A). The content is preferably 0.1 to 5.0 parts by weight and particularly preferably 0.3 to 3.0 parts by weight in order to continue the roll lubricity effect without plate out to a roll and to maintain the biomass degree. The polymer having a content of less than 0.1 part by weight is unlikely to improve the roll lubricity, and the polymer having a content of more than 10.0 parts by weight cannot achieve effects corresponding to the amount added and reduces the biomass degree. Here, the biomass degree means the ratio of the dry weight of biomass used to the dry weight of the film or sheet.

[Tetrafluoroethylene Polymer (C)]

The tetrafluoroethylene polymer (C) included in the film or sheet of the present invention can improve the melt tension of the poly lactic acid (A)-containing resin composition and achieve oriented crystallization in a flow field in the melt film formation process to accelerate the crystallization of the poly lactic acid (A). The tetrafluoroethylene polymer (C) also works as a crystal nucleating agent for the poly lactic acid (A). Hence, the temperature setting of the resin composition immediately after the film formation to around a crystallization temperature can further accelerate the crystallization of the poly lactic acid (A). Thus, the tetrafluoroethylene polymer (C) accelerates the crystallization of the poly lactic acid (A) and therefore can provide heat resistance to the film or sheet of the present invention. The tetrafluoroethylene polymer (C) is also effective for the prevention of drip during the flame retardant evaluation described later of the film or sheet of the present invention.

The tetrafluoroethylene polymer (C) used in the present invention is a homopolymer of tetrafluoroethylene or a copolymer of tetrafluoroethylene and another monomer, and examples include polytetrafluoroethylene, perfluoroalkoxyalkane (a copolymer of tetrafluoroethylene and perfluoroalkyl vinyl ether), a perfluoroethylene propene copolymer (a copolymer of tetrafluoroethylene and hexafluoropropylene), an ethylene-tetrafluoroethylene copolymer (a copolymer of tetrafluoroethylene and ethylene), and a copolymer of tetrafluoroethylene and perfluorodioxole. Polytetrafluoroethylene is preferred.

It is supposed that the effect of the tetrafluoroethylene polymer (C) as a crystal nucleating agent on the poly lactic acid (A) depends on the crystal structure of the tetrafluoroethylene polymer (C). Wide angle x-ray diffraction revealed that the poly lactic acid (A) had a crystal lattice having an interplanar spacing of 4.8 angstroms while the tetrafluoroethylene polymer had a crystal lattice having an interplanar spacing of 4.9 angstroms. The results suggest that the tetrafluoroethylene polymer (C) can work as the crystal nucleating agent for the poly lactic acid (A) due to an epitaxial effect. Here, the epitaxis means the crystal growth of the poly lactic acid (A) that is aligned with the crystal face on the crystal surface of the tetrafluoroethylene polymer (C) in the crystal growth of the poly lactic acid (A) on the surface of the tetrafluoroethylene polymer (C).

The tetrafluoroethylene polymer (C) has the same interplanar spacing as that of a copolymer of tetrafluoroethylene and another monomer because the interplanar spacing depends on the crystal form of the tetrafluoroethylene moiety. Hence, as long as the crystal form of the polytetrafluoroethylene is maintained and the physical properties are not greatly changed, the amount of another monomer component in the copolymer is not specifically limited, but is commonly preferably 5% by weight or less in the tetrafluoroethylene polymer (C).

The polymerization method of the tetrafluoroethylene polymer (C) is not particularly limited but is specifically preferably emulsification polymerization. The tetrafluoroethylene polymer (C) obtained through the emulsification polymerization is readily fibrillated to readily form a network structure in the poly lactic acid (A). Then, this is supposed to improve the melt tension of the resin composition including the poly lactic acid (A) and to effectively accelerate the crystallization of the poly lactic acid (A) in the flow field in the melt film formation process.

The weight average molecular weight of the tetrafluoroethylene polymer (C) is not particularly limited, and commonly 1,000,000 to 10,000,000 and preferably 2,000,000 to 8,000,000.

Furthermore, for uniform dispersion in the poly lactic acid (A), particles of the "tetrafluoroethylene polymer (C)" may be modified with a polymer having high affinity to the poly lactic acid (A), such as a (meth)acrylic acid ester polymer. Examples of such a tetrafluoroethylene polymer (C) include acrylic-modified polytetrafluoroethylene.

Commercially available tetrafluoroethylene polymers (C) may be used, and examples of the commercially available polytetrafluoroethylene include "Fluon CD-014", "Fluon CD-1", and "Fluon CD-145" manufactured by ASAHI GLASS CO., LTD. Examples of the commercially available acrylic-modified polytetrafluoroethylene include METABLEN (registered trademark), series A (for example, METABLEN A-3000 and METABLEN A-3800) manufactured by MITSUBISHI RAYON CO., LTD.

The content of the tetrafluoroethylene polymer (C) is commonly 0.5 to 15.0 parts by weight based on 100 parts by weight of the poly lactic acid (A). The content is preferably 0.7 to 10.0 parts by weight and particularly preferably 1.0 to 5.0 parts by weight in order to improve the melt tension, to maintain the biomass degree, and to obtain a good surface condition. The polymer having a content of less than 0.5 part by weight is unlikely to improve the melt tension, and the polymer having a content of more than 15.0 parts by weight cannot achieve effects corresponding to the amount added and reduces the biomass degree.

[Aromatic-Condensed Phosphoric Acid Ester-Containing Flame Retardant (D)]

The aromatic-condensed phosphoric acid ester-containing flame retardant (D) included in the film or sheet of the present invention has an effect as a flame retardant to provide desired flame retardancy to the resin composition including the poly lactic acid (A). The aromatic-condensed phosphoric acid ester-containing flame retardant (D) includes a compound represented by General Formula (I).

[Formula 2]

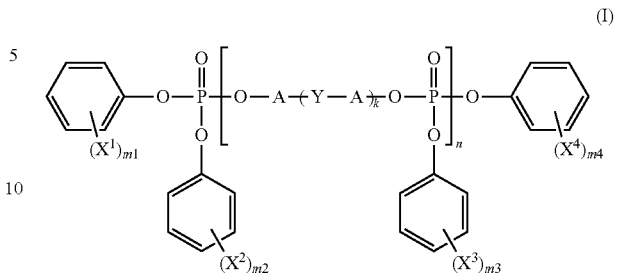

(where each A is independently an arylene group having 6 to 18 carbon atoms optionally further substituted with 1 to 3 alkyl groups having 1 to 6 carbon atoms; each Y is independently a single bond or an alkylene group having 1 to 6 carbon atoms; each of $X^1$ to $X^4$ is independently an alkyl group having 1 to 14 carbon atoms, an aryl group having 6 to 18 carbon atoms, an alkoxy group having 1 to 8 carbon atoms, or an aryloxy group having 6 to 18 carbon atoms; k is an integer of 0 to 2; each of m1 to m4 is independently an integer of 0 to 4; and n is an integer of 1 to 5)

Hereinafter, the definition of each group in General Formula (I) will be described in details.

The "arylene group having 6 to 18 carbon atoms" in the "arylene group having 6 to 18 carbon atoms optionally further substituted with 1 to 3 alkyl groups having 1 to 6 carbon atoms" represented by A means a divalent aromatic hydrocarbon group having 6 to 18 carbon atoms. Examples of the group include phenylene groups (for example, a 1,2-phenylene group, a 1,3-phenylene group, and a 1,4-phenylene group) and naphthylene groups (for example, a 1,2-naphthylene group, a 1,3-naphthylene group, a 1,4-naphthylene group, a 1,5-naphthylene group, a 1,6-naphthylene group, a 1,7-naphthylene group, a 2,3-naphthylene group, a 2,4-naphthylene group, a 2,6-naphthylene group, and a 2,7-naphthylene group). Preferred are phenylene groups (preferably a 1,3-phenylene group and a 1,4-phenylene group) and naphthylene groups (preferably a 1,4-naphthylene group).

The "arylene group having 6 to 18 carbon atoms" may be further substituted with 1 to 3 alkyl groups having 1 to 6 carbon atoms in addition to two phosphate groups, and the alkyl groups may be the same as or different from each other.

Here, the "alkyl group having 1 to 6 carbon atoms" means a straight or branched saturated hydrocarbon group having 1 to 6 carbon atoms. Examples of the group include a methyl group, an ethyl group, a propyl group, an isopropyl group, a butyl group, an isobutyl group, a sec-butyl group, a tert-butyl group, a pentyl group, an isopentyl group, a neopentyl group, a 1,2-dimethylpropyl group, a 1-ethylpropyl group, a hexyl group, an isohexyl group, a 1,2,2-trimethylpropyl group, a 1,1-dimethylbutyl group, a 2,2-dimethylbutyl group, a 3,3-dimethylbutyl group, and a 2-ethylbutyl group. Preferred are alkyl groups having 1 to 4 carbon atoms, and more preferred are a methyl group and a tert-butyl group.

A is preferably an arylene group having 6 to 18 carbon atoms [preferably a phenylene group (preferably a 1,3-phenylene group or a 1,4-phenylene group) or a naphthylene group (preferably a 1,4-naphthylene group)] that may be further substituted with 1 to 3 alkyl groups having 1 to 4 carbon atoms (preferably a methyl group or a tert-butyl group), and more preferably a 1,3-phenylene group, a 1,4-phenylene group, a 1,4-naphthylene group, or a 2-tert-butyl-5-methyl-1,4-phenylene group.

When two or more As are present, As may be the same as or different from each other and are preferably the same.

The "alkylene group having 1 to 6 carbon atoms" represented by Y means a divalent group derived from a straight or branched saturated hydrocarbon having 1 to 6 carbon atoms, and two bonds from the divalent group may be on the same carbon atom or different carbon atoms. Examples of the group include a methylene group, an ethylene group, propylene groups (for example, a 1,2-propylene group and a 1,3-propylene group), butylene groups (for example, a 1,2-butylene group, a 1,3-butylene group, a 1,4-butylene group, and a 2,3-butylene group), a 2-methyl-1,2-propylene group, a 2-methyl-1,3-butylene group, pentylene groups (for example, a 1,2-pentylene group, a 1,3-pentylene group, a 1,4-pentylene group, a 1,5-pentylene group, a 2,3-pentylene group, and a 2,4-pentylene group), hexylene groups (for example, a 1,2-hexylene group, a 1,3-hexylene group, a 1,4-hexylene group, a 1,5-hexylene group, a 1,6-hexylene group, a 2,3-hexylene group, a 2,4-hexylene group, a 2,5-hexylene group, and a 3,4-hexylene group), a methylidene group, an ethylidene group, a propylidene group, an isopropylidene group, a butylidene group, an isobutylidene group, a sec-butylidene group, and a tert-butylidene group. Alkylene groups having 1 to 3 carbon atoms are preferred and a methyl group, an ethyl group, an ethylidene group, and an isopropylidene group are more preferred.

Y is preferably a single bond or an alkylene group having 1 to 3 carbon atoms and more preferably a single bond, a methyl group, an ethyl group, an ethylidene group, or an isopropylidene group.

When two or more Ys are present, Ys may be the same as or different from each other and are preferably the same.

The "alkyl group having 1 to 14 carbon atoms" represented by $X^1$, $X^2$, $X^3$, or $X^4$ means a straight or branched saturated hydrocarbon group having 1 to 14 carbon atoms. Examples of the group include a methyl group, an ethyl group, a propyl group, an isopropyl group, a butyl group, an isobutyl group, a sec-butyl group, a tert-butyl group, a pentyl group, an isopentyl group, a neopentyl group, a 1,2-dimethylpropyl group, a 1-ethylpropyl group, a hexyl group, an isohexyl group, a 1,2,2-trimethylpropyl group, a 1,1-dimethylbutyl group, a 2,2-dimethylbutyl group, a 3,3-dimethylbutyl group, a 2-ethylbutyl group, a heptyl group, an isoheptyl group, an octyl group, an isooctyl group, a nonyl group, an isononyl group, a decyl group, an isodecyl group, an undecyl group, an isoundecyl group, a dodecyl group, an isododecyl group, a tridecyl group, an isotridecyl group, a tetradecyl group, and an isotetradecyl group. Alkyl groups having 1 to 4 carbon atoms are preferred, and a methyl group and a tert-butyl group are more preferred.

The "aryl group having 6 to 18 carbon atoms" represented by $X^1$, $X^2$, $X^3$, or $X^4$ means an aromatic hydrocarbon group having 6 to 18 carbon atoms. Examples of the group include a phenyl group and naphthyl groups (for example, a 1-naphthyl group and a 2-naphthyl group).

The "alkoxy group having 1 to 8 carbon atoms" represented by $X^1$, $X^2$, $X^3$, or $X^4$ means a hydroxy group substituted with an alkyl group having 1 to 8 carbon atoms among the above "alkyl groups having 1 to 14 carbon atoms". Examples of the group include a methoxy group, an ethoxy group, a propoxy group, an isopropoxy group, a butoxy group, an isobutoxy group, a sec-butoxy group, a tert-butoxy group, a pentyloxy group, an isopentyloxy group, a neopentyloxy group, a 1,2-dimethylpropoxy group, a 1-ethylpropoxy group, a hexyloxy group, an isohexyloxy group, a 1,2,2-trimethylpropoxy group, a 1,1-dimethylbutoxy group, a 2,2-dimethylbutoxy group, a 3,3-dimethylbutoxy group, a 2-ethylbutoxy group, a heptyloxy group, an isoheptyloxy group, an octyloxy group, and an isooctyloxy group.

The "aryloxy group having 6 to 18 carbon atoms" represented by $X^1$, $X^2$, $X^3$, or $X^4$ means a hydroxy group substituted with the above "aryl group having 6 to 18 carbon atoms". Examples of the group include a phenoxy group and naphtyloxy groups (for example, a 1-naphtyloxy group and a 2-naphtyloxy group).

Each of $X^1$, $X^2$, $X^3$, and $X^4$ is preferably alkyl groups having 1 to 14 carbon atoms, more preferably alkyl groups having 1 to 4 carbon atoms, and even more preferably a methyl group and a tert-butyl group.

When two or more $X^1$s are present, $X^1$s may be the same as or different from each other and are preferably the same. When two or more $X^2$s are present, $X^2$s may be the same as or different from each other and are preferably the same. When two or more $X^3$s are present, $X^3$s may be the same as or different from each other and are preferably the same. When two or more $X^4$s are present, $X^4$s may be the same as or different from each other and are preferably the same.

Furthermore, $X^1$, $X^2$, $X^3$, and $X^4$ may be the same as or different from each other and are preferably the same.

k is an integer of 0 to 2.

Each of m1 to m4 is independently an integer of 0 to 4 and preferably an integer of 0 to 2. m1, m2, m3, and m4 may be the same as or different from each other and are preferably the same.

n is an integer of 1 to 5, preferably an integer of 1 to 3, and more preferably 1.

The compound represented by General Formula (I) is preferably a compound in which A is an arylene group having 6 to 18 carbon atoms [preferably a phenylene group (preferably a 1,3-phenylene group or a 1,4-phenylene group) or a naphthylene group (preferably 1,4-naphthylene group)] that may be further substituted with 1 to 3 alkyl groups having 1 to 4 carbon atoms (preferably a methyl group or a tert-butyl group) (preferably a 1,3-phenylene group, a 1,4-phenylene group, a 1,4-naphthylene group, or a 2-tert-butyl-5-methyl-1,4-phenylene group); Y is a single bond or an alkylene group having 1 to 3 carbon atoms (preferably a single bond, a methyl group, an ethyl group, an ethylidene group, or an isopropylidene group); $X^1$ to $X^4$ are an alkyl group having 1 to 14 carbon atoms (preferably an alkyl group having 1 to 4 carbon atoms, and more preferably a methyl group or a tert-butyl group); k is an integer of 0 to 2; m1 to m4 are an integer of 0 to 2; and n is an integer of 1 to 3 (preferably 1).

Examples of the compound represented by General Formula (I) include 1,3-phenylene-bis(diphenyl phosphate), 1,3-phenylene-bis(di-2,6-xylenyl phosphate), 1,4-naphthylene-bis(diphenyl phosphate), 4,4'-biphenylene-bis(diphenyl phosphate), 4,4'-p-terphenylene-bis(diphenyl phosphate), 4,4'-(methylene diphenyl)-bis(diphenyl phosphate), 4,4'-(ethylene diphenyl)-bis(diphenyl phosphate), 4,4'-(ethylidene diphenyl)-bis(diphenyl phosphate), 4,4'-(isopropylidene diphenyl)-bis(diphenyl phosphate) [another name, bisphenol A bis(diphenyl phosphate)], 4,4'-(isopropylidene diphenyl)-bis[di(2-t-butylphenyl)phosphate)], 4,4'-(isopropylidene diphenyl)-bis[di(2,4-di-t-butylphenyl)phosphate)], and 4,4'-[isopropylidene-di(2-t-butyl-5-methylphenyl)]-bis (diphenyl diphosphate). Among them, preferred are 1,3-phenylene-bis(diphenyl phosphate), 1,3-phenylene-bis(di-2,6-xylenyl phosphate), and 4,4'-(isopropylidene diphenyl)-bis (diphenyl phosphate) from the viewpoint of compatibility with poly lactic acid and flame-retardant effect. These compounds can be produced by a known method.

The aromatic-condensed phosphoric acid ester-containing flame retardant (D) includes at least one compound represented by General Formula (I) as a main component. Specifically, the content is commonly 90% by weight or more and preferably 95% by weight to 100% by weight. Other components in the aromatic-condensed phosphoric acid ester-containing flame retardant (D) is not specifically limited as long as the object of the present invention is not impaired.

For the aromatic-condensed phosphoric acid ester-containing flame retardant (D), commercial products may be used. Examples of the commercial product include "PX-200", "CR-741", and "CR733S" manufactured by DAIHACHI CHEMICAL INDUSTRY CO., LTD.

The aromatic-condensed phosphoric acid ester-containing flame retardant (D) is suitable for providing the flame retardancy to the poly lactic acid (A)-containing resin composition. It also has excellent hydrolysis resistance, and hence the flame retardancy is not reduced even when the film or sheet is used for a long time.

Furthermore, the aromatic-condensed phosphoric acid ester-containing flame retardant (D) is melted within a temperature range where the poly lactic acid (A)-containing resin composition is melted and kneaded, and has good compatibility with the poly lactic acid (A). Thus, the retardant is unlikely to reduce the original mechanical properties (for example, breaking strength and tear strength) of the poly lactic acid (A) even when the retardant is contained in a large amount. The aromatic-condensed phosphoric acid ester-containing flame retardant (D) has good compatibility with the poly lactic acid (A), and hence has a plasticization effect to improve brittleness of the poly lactic acid (A).

The content of the aromatic-condensed phosphoric acid ester-containing flame retardant (D) is commonly 10 to 80 parts by weight based on 100 parts by weight of the poly lactic acid (A). The content is preferably 15 to 60 parts by weight and more preferably 20 to 50 parts by weight in order to preserve the flame retardancy in the UL94 VTM-0 standard and to suppress the decrease of relative crystallization rate and the increase of heat deformation rate. The retardant having a content of less than 10 parts by weight cannot achieve the flame-retardant effect, and also provides little plasticization effect. The retardant having a content of more than 80 parts by weight causes the reduction of mechanical properties (for example, breaking strength and tear strength) and bleed out.

The aromatic-condensed phosphoric acid ester-containing flame retardant (D) may inhibit the crystallization of the poly lactic acid (A) because the retardant has good compatibility with the poly lactic acid (A). However, the addition of the retardant in the amount described above required for providing the flame retardancy little affects the crystallization of the poly lactic acid (A) and does not inhibit the provision of the heat resistance to the film or sheet of the present invention.

[Crystallization Accelerator (E)]

The resin composition of the present invention may include another crystallization accelerator (E) in addition to the tetrafluoroethylene polymer (C). The crystallization accelerator (E) is not specifically limited as long as it has a crystallization acceleration effect, but it is desirable to select a substance having a crystal structure that has an interplanar spacing similar to the interplanar spacing of the crystal lattice of the poly lactic acid (A). This is because a substance including a crystal lattice having an interplanar spacing more similar to the interplanar spacing of the crystal lattice of the poly lactic acid (A) has a higher effect as a crystal nucleating agent for the poly lactic acid (A). Examples of such a crystallization accelerator (E) include organic substances such as melamine polyphosphate, melamine cyanurate, zinc phenylphosphonate, calcium phenylphosphonate, and magnesium phenylphosphonate and inorganic substances such as talc and clay. Among them, zinc phenylphosphonate is preferred because it has the interplanar spacing most similar to the interplanar spacing of the poly lactic acid (A) and can provide good crystallization acceleration effect.

A commercially available crystallization accelerator (E) may be used. Examples of the commercially available zinc phenylphosphonate include "ECOPROMOTE" manufactured by Nissan Chemical Industries, Ltd.

The content of the crystallization accelerator (E) is commonly 0.1 to 5 parts by weight based on 100 parts by weight of the poly lactic acid (A). The content is preferably 0.3 to 3 parts by weight in order to further accelerate the crystallization and to maintain the biomass degree. The accelerator having a content of less than 0.1 part by weight is unlikely to accelerate the crystallization, and the accelerator having a content of more than 5 parts by weight cannot achieve effects corresponding to the amount added and reduces the biomass degree.

The poly lactic acid (A)-containing resin composition may include various additives as necessary as long as the object of the present invention is not impaired. Examples of such additives include known antioxidants, ultraviolet absorbers, plasticizers, stabilizers, release agents, antistatic agents, colorants, and drip inhibitors.

For the flame retardant evaluation of the film or sheet of the present invention, a flammability test is carried out in accordance with UL94, VTM test (vertical flammability test for thin material) to classify the film or sheet into VTM-0, VTM-1, VTM-2, and NOTVTM. The criteria for the classification are in accordance with "UL 94, the Standard for Safety of Flammability of Plastic Materials for Parts in Devices and Appliances Testing, the fifth edition" (Underwriters Laboratories Inc.).

It is preferable that the film or sheet of the present invention is classified into VTM-0 in the test, that is, the film or sheet meets VTM-0 in UL94 standard.

The tear strength of the film or sheet of the present invention is determined in accordance with "Paper-Determination of tearing resistance-Elmendorf tearing tester method" in Japanese Industrial Standard P8116.

The film or sheet of the present invention preferably has a tear strength of 2.7 N/mm or more.

More preferably, the film or sheet of the present invention has a thickness of 10 to 500 μm, satisfies the flame-retardant standard of UL94 VTM-0, and has a tear strength of 2.7 N/mm or more.

The film or sheet of the present invention satisfying the flame-retardant standard of UL94 VTM-0 and having a tear strength of 2.7 N/mm or more can be achieved by limiting each content of the poly lactic acid (A), the acidic functional group-modified olefinic polymer (B), the tetrafluoroethylene polymer (C), and the aromatic-condensed phosphoric acid ester-containing flame retardant (D) within the range defined by the present invention. In particular, it is important to limit the content of the aromatic-condensed phosphoric acid ester-containing flame retardant (D) within the range defined by the present invention.

The heat deformation rate of the film or sheet of the present invention is determined in accordance with the heat deformation test in Japanese Industrial Standard C3005.

The film or sheet of the present invention preferably has a deformation rate of 40% or less under a load of 10 N for 30 minutes in a temperature environment of 150° C.

The relative crystallization rate of the film or sheet of the present invention is calculated using Equation (1) from the amount of heat ΔHc of the exothermic peak associated with crystallization of a sample of the film or sheet in a temperature rise process after film formation and the amount of heat ΔHm associated with the subsequent melting that are determined by DSC.

$$\text{Relative crystallization rate (\%)} = (\Delta Hm - \Delta Hc)/\Delta Hm \times 100 \quad (1)$$

The film or sheet of the present invention preferably has a relative crystallization rate of 50% or more.

More preferably, the film or sheet of the present invention has a deformation rate of 40% or less under a load of 10 N for 30 minutes in a temperature environment of 150° C. in accordance with the heat test in Japanese Industrial Standard C3005 and has a relative crystallization rate of 50% or more that is calculated from Equation (1).

In order to obtain the film or sheet of the present invention having a deformation rate of 40% or less and a relative crystallization rate of 50% or more, it is important to limit each content of the poly lactic acid (A), the acidic functional group-modified olefinic polymer (B), the tetrafluoroethylene polymer (C), and the aromatic-condensed phosphoric acid ester-containing flame retardant (D) within the range defined by the present invention, specifically, to limit the content of the tetrafluoroethylene polymer (C) and the content of the aromatic-condensed phosphoric acid ester-containing flame retardant (D) within the ranges defined by the present invention. In order to achieve the film or sheet of the present invention having a deformation rate of 40% or less and a relative crystallization rate of 50% or more, it is also important to employ, as the method for manufacturing the film or sheet of the present invention, a manufacturing method (described later) that includes forming a film from a poly lactic acid (A)-containing resin composition by melt film formation, in which the resin composition during the melt film formation has a temperature between a temperature 15° C. higher than a crystallization temperature (Tc) of the resin composition in a temperature drop process and a temperature 5° C. lower than a melting temperature (Tm) in a temperature rise process and/or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)].

The film or sheet of the present invention may be used for applications similar to those of common films or sheets, but in particular, can be suitably used as a base material of a pressure-sensitive adhesive film or sheet.

The method for manufacturing the film or sheet of the present invention is not particularly limited and is preferably a method of forming a film from the poly lactic acid (A)-containing resin composition by melt film formation. For example, the film or sheet of the present invention can be manufactured by preparing the poly lactic acid (A)-containing resin composition including each component that is homogeneously dispersed by a continuous melt kneader such as a twin screw extruder or a batch melt kneader such as a pressure kneader, a Banbury mixer, and a roll kneader, then by forming a film from the resin composition by an extrusion method such as a T-die method and an inflation method, calendering, polishing, or the like, and by cooling and solidifying the film. The melt film formation is preferably a technique of forming a film having a desired thickness by passing the melted resin composition through a space between two metal rolls, and is particularly preferably calendering and polishing.

The thickness of the film or sheet of the present invention is properly adjusted depending on the intended use, but is commonly 10 to 500 μm, preferably 20 to 400 μm, and particularly preferably 30 to 300 μm.

When the poly lactic acid (A)-containing resin composition is formed into a film by the melt film formation, the temperature of the resin composition during the melt film formation is not particularly limited, but is preferably between a temperature 15° C. higher than a crystallization temperature (Tc) of the resin composition in a temperature drop process and a temperature 5° C. lower than a melting temperature (Tm) in a temperature rise process. The adjustment to such a temperature accelerates the crystallization of the poly lactic acid (A) and readily provides the heat resistance to the film or sheet of the present invention.

For example, when the resin composition is melted to be formed into a film by calendering, the temperature of the resin composition during the calender rolling is adjusted to between a temperature 15° C. higher than a crystallization temperature (Tc) of the resin composition in a temperature drop process and a temperature 5° C. lower than a melting temperature (Tm) in a temperature rise process. Such rolling at a melting point or lower accelerates the oriented crystallization. The acceleration effect on the oriented crystallization is much improved by the combination of the tetrafluoroethylene polymer (C) with the resin composition. The tetrafluoroethylene polymer (C) is fibrillated to form a network in the resin composition and also works as the crystal nucleating agent. It is supposed that such a synergistic effect accelerates the oriented crystallization. Therefore, by the rolling within the temperature range, the film or sheet of the present invention can obtain a smooth surface condition as well as good heat resistance due to the oriented crystallization acceleration effect (that is, the reduction of the relative crystallization rate is suppressed, and the increase of the heat deformation rate is suppressed).

The method for manufacturing the poly lactic acid-containing film or sheet of the present invention may further include a step of controlling a temperature condition after the melt film formation in order to effectively accelerate the crystallization by the tetrafluoroethylene polymer (C). Specifically, the melt film formed resin composition may be cooled and solidified after a step of accelerating the crystallization (hereinafter, also simply abbreviated to "crystallization accelerating step") by once keeping the resin composition between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)]. That is, the crystallization accelerating step is a step of subjecting the melt film formed resin composition to a condition where the temperature is controlled between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)], and a step of capable of accelerating the crystallization of the resin composition while maintaining the smooth surface condition after the melt film formation. Examples of such a temperature control method include, but are not particularly limited to, a method of bringing the melt film formed resin composition into direct contact with a roll, belt, or the like that can be heated to a predetermined temperature.

In particular, the melt film formed resin composition is preferably brought into contact with a metal roll having a predetermined surface temperature from the viewpoint of constant control at a predetermined temperature. Hence, also in the step, the poly lactic acid (A)-containing resin composition is desirably a composition that can be readily removed from a metal roll, and from the viewpoint, the acidic functional group-modified olefinic polymer (B) is required to be added.

It is preferred that the time for the crystallization accelerating step is as long as possible. The time is not necessarily limited because it finally depends on the crystallization degree of the resin composition, but is commonly 2 to 10 seconds and preferably 3 to 8 seconds.

In the crystallization accelerating step, even when the crystallization temperature (Tc) of the resin composition in a temperature drop process is changed due to, for example, the addition of another crystal nucleating agent, the maximum temperature of an exothermic peak associated with the crystallization in a temperature drop process is previously determined by DSC measurement to constantly give an optimum temperature condition for the crystallization accelerating step. At that time, the consideration to the shape change of the film or sheet obtained by heat at the temperature is little required, but the step is preferably performed at a temperature at which the obtained film or sheet has a heat deformation rate of 40% or less.

The method for manufacturing the poly lactic acid-containing film or sheet of the present invention is preferably a method that includes forming a film from a poly lactic acid (A)-containing resin composition by melt film formation. In the method, the resin composition during the melt film formation has a temperature between a temperature 15° C. higher than a crystallization temperature (Tc) of the resin composition in a temperature drop process and a temperature 5° C. lower than a melting temperature (Tm) in a temperature rise process and/or the melt film formed resin composition is cooled and solidified after a crystallization accelerating step between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)].

In the method for manufacturing the poly lactic acid-containing film or sheet of the present invention including the crystallization accelerating step, the resin composition is crystallized in the crystallization accelerating step and then cooled and solidified. Hence the internal stress is unlikely to remain, and the obtained film or sheet does not cause large heat shrink when it is used. Therefore, the highly crystallized film or sheet of the present invention that is prepared by the manufacturing method can keep the shape to near the melting point of the poly lactic acid and can be sufficiently used for applications that require heat resistance and that are not previously applicable.

The manufacturing method has large advantages in economy and productivity because it does not require inefficient steps of cooling and solidifying and then heating again.

It is desirable that the method for manufacturing the poly lactic acid-containing film or sheet of the present invention including the crystallization accelerating step is continuously carried out from the melt film formation step, the crystallization accelerating step, to the cooling and solidifying step from the viewpoint of productivity because such a system shortens the treatment time. Examples of such a method include methods using a calender film formation machine, a polishing film formation machine, and the like.

FIG. 1 shows a schematic view of a calender film formation machine in one embodiment used in the manufacturing method. Hereinafter, FIG. 1 will be described in detail.

Between four calender rolls, a first roll (1), a second roll (2), a third roll (3), and a fourth roll (4), the melted resin composition is rolled to gradually reduce the thickness. The rolling is adjusted so that the resin composition will have a desired thickness after the resin composition is finally passed through between the third roll (3) and the fourth roll (4). In the case of the calender film formation, the film formation of the resin composition from the first to fourth rolls (1) to (4) corresponds to the "melt film formation step". Take off rolls (5) having a temperature between a temperature 25° C. lower than a crystallization temperature (Tc) of the resin composition in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)] are a roll group with which the melt film formed resin composition (8) is initially in contact. The roll group includes one or more rolls (three rolls in FIG. 1) and removes the melted resin composition (8) from the fourth roll (4). When a plurality of take off rolls (5) are used in this manner and the temperature of each roll can be controlled, each roll preferably has the same temperature but may have a different temperature within a desired temperature range. A larger number of the take off rolls (5) increases the time for isothermal crystallization and has an advantage in the acceleration of crystallization. In the case of the calender film formation, the crystallization of the melt film formed resin composition (8) is accelerated on the take off rolls (5), and thus the step of passing the resin composition (8) through the take off rolls (5) corresponds to the "crystallization accelerating step".

Two cool rolls (6) and (7) cool and solidify the resin composition (8) by passing the resin composition (8) between them while forming the surface into a desired shape. Thus, commonly, one roll (for example, the cool roll (6)) is a metal roll that has a surface designed for providing a surface shape to the resin composition (8), and the other roll (for example, the cool roll (7)) is a rubber roll. In Fig. each arrow means a rotation direction of a corresponding roll.

Figure 2:
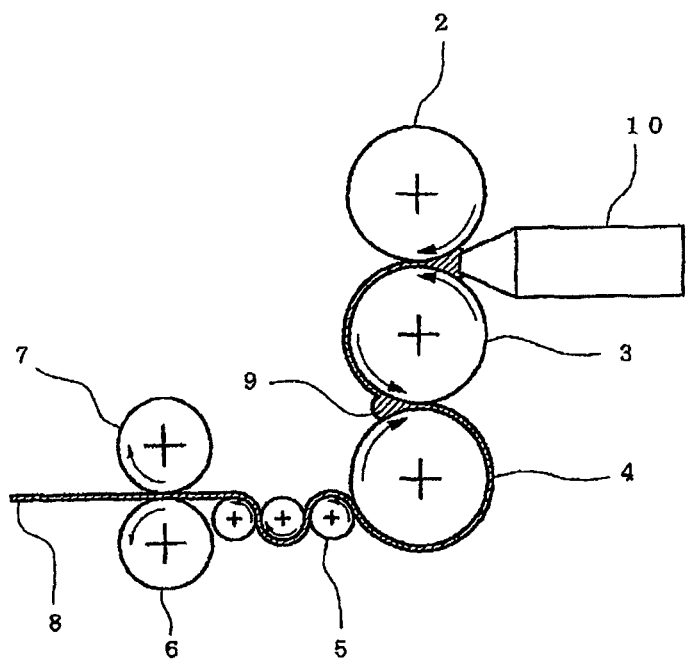
FIG. 2 is a schematic view of a polishing film formation machine.

FIG. 2 shows a schematic view of a polishing film formation machine in one embodiment used in the manufacturing method. Hereinafter, FIG. 2 will be described in detail.

An extruder leading end (10) of an extruder (not shown in the drawing) is placed between a heated second roll (2) and a heated third roll (3). Between the second roll (2) and the third roll (3), a melted resin composition (8) is continuously extruded at a predetermined pushing-out speed. The extruded resin composition (8) is rolled between the second roll (2) and the third roll (3) to have a smaller thickness. The rolling is adjusted so that the resin composition will have a desired thickness after the resin composition is finally passed through between the third roll (3) and the fourth roll (4). In the case of the polishing film formation, the film formation of the resin composition (8) from the second to fourth rolls (2) to (4) corresponds to the "melt film formation step". Then, the film is passed through three take off rolls (5) having a temperature between a temperature 25° C. lower than a crystallization temperature (Tc) of the resin composition (8) in a temperature drop process and a temperature 10° C. higher than the crystallization temperature (Tc) [preferably between a temperature 10° C. higher than the crystallization temperature (Tc) and a temperature 10° C. lower than the crystallization temperature (Tc)] and finally passed through cool rolls (6) and (7) to prepare a solidified film or sheet. In the case of the polishing film formation, the step of passing the resin composition through the take off rolls (5) corresponds to the "crystallization accelerating step".

EXAMPLES

Hereinafter, the present invention will be further specifically described with reference to examples and comparative examples. The present invention is not intended to be limited to them. Evaluations in examples and the like are carried out as follows.

Abbreviations of material names to be used in Table 1 are shown below.

[Poly lactic Acid (A)]

A1: Lacea H-400 (manufactured by Mitsui Chemicals, Inc.)

[Acidic Functional Group-Modified Olefinic Polymer (B)]

B1: maleic anhydride group-modified polypropylene (weight average molecular weight=49,000, acid value=26 mg KOH/g): Umex 1001 (manufactured by Sanyo Chemical Industries, Ltd.)

B2: maleic anhydride group-modified polypropylene (weight average molecular weight=32,000, acid value=52 mg KOH/g): Umex 1010 (manufactured by Sanyo Chemical Industries, Ltd.)

In order to be compared with the component (B1) and the component (B2), a component (B') below was studied.

B': unmodified low molecular weight polypropylene (weight average molecular weight=23,000, acid value=0 mg KOH/g): VISCOL 440P (manufactured by Sanyo Chemical Industries, Ltd.)

[Tetrafluoroethylene Polymer (C)]

C1: polytetrafluoroethylene: Fluon CD-014 (manufactured by ASAHI GLASS CO., LTD.)

C2: acrylic-modified polytetrafluoroethylene: METABLEN A-3000 (manufactured by MITSUBISHI RAYON CO., LTD.)

[Aromatic-Condensed Phosphoric Acid Ester-Containing Flame Retardant (D)]

D1: 1,3-phenylene-bis(di-2,6-xylenyl phosphate): PX-200 (manufactured by DAIHACHI CHEMICAL INDUSTRY CO., LTD.), a powder having a melting point of 95° C.

D2: bisphenol A bis(diphenyl phosphate): CR-741 (manufactured by DAIHACHI CHEMICAL INDUSTRY CO., LTD.), a liquid having a freezing point of 4° C.

In order to be compared with the component (D1) and the component (D2), a component (D') below was studied.

D': melamine polyphosphate: MPP-A (manufactured by SANWA Chemical Co., Ltd.), a powder having an average particle diameter of 4 μm

[Crystallization Accelerator (E)]

E1: zinc phenylphosphonate: ECOPROMOTE (manufactured by Nissan Chemical Industries, Ltd.)

Example 1

The raw materials above were mixed in a compounding ratio shown in Table 1 to prepare a resin composition. The resin composition was melted and kneaded with a Banbury mixer, and then subjected to calender film formation using a 4-roll inverted L calender so as to have a thickness of 100 μm. Next, as shown in FIG. 1, three rolls (take off rolls) that could be heated at any temperature were placed immediately after the melt film formation step to arrange a crystallization accelerating step where the melt film formed resin composition could be passed while the upper side and the lower side of the film alternately came in contact with the rolls. Then, the resin composition was solidified by passing through cool rolls to prepare a film. The temperature of the resin composition during the melt film formation was regarded as the surface temperature of the roll corresponding to the fourth roll (4) in FIG. 1, and for the temperature of the resin composition in the crystallization accelerating step, the surface temperatures of three take off rolls (5) in FIG. 1 were adjusted to substantially the same and regarded as the crystallization acceleration temperature. The film formation speed was 5 m/min, and the substantial time for the crystallization accelerating step (passage time through the take off rolls) was about 5 seconds.

Examples 2 to 10

Each resin composition was prepared in the compounding ratio shown in Table 1 and subjected to the same operation as that in Example 1 to prepare each film of Examples 2 to 10.

Comparative Examples 1 to 5

Each resin composition was prepared in the compounding ratio shown in Table 1 and subjected to the same operation as that in Example 1 to prepare each film of Comparative Examples 1 to 5.

<Melting Temperature>

The endothermic peak temperature associated with the melting of the resin composition in a temperature rerise process after film formation was determined by DSC to be regarded as the melting temperature (Tm; also referred to as crystal melting peak temperature).

<Crystallization Temperature>

The exothermic peak temperature associated with the crystallization of the resin composition in a temperature drop process from 200° C. after film formation was determined by DSC to be regarded as the crystallization temperature (Tc; also referred to as crystallization peak temperature).

<Film Formability Result>

(1) Plate out to roll: A roll surface was visually observed and evaluated as "A" for no dirt on the roll surface, as "C" for any dirt on the roll surface, and as "B" for any dirt on only a part of the roll surface.

(2) Releasability: The releasability was evaluated on the melt film formed resin composition from the fourth roll (4) in FIG. 1. The resin composition capable of being taken off onto the take off rolls (5) was evaluated as "good", and that incapable of being taken off onto the take off rolls (5) was evaluated as "poor". Comparative Example 2 was not evaluated because it was not removed.

(3) Film surface condition: It was visually observed. The film surface that was not rough but smooth was evaluated as "A", that having bank marks (irregularity due to uneven flow of the resin), shark skin, or pinholes was evaluated as "C", and that having indistinctive bank marks or shark skin was evaluated as "B". Comparative Example 2 was not evaluated because it was not removed.

<Relative Crystallization Rate>

The amount of heat ΔHc of the exothermic peak associated with the crystallization of the film sample in the temperature rise process after film formation and the amount of heat ΔHm associated with the subsequent melting were determined by DSC to calculate the relative crystallization rate using Equation (1). Comparative Example 2 was not evaluated because it was not removed.

$$\text{Relative crystallization rate (\%)} = (\Delta Hm - \Delta Hc)/\Delta Hm \times 100 \quad (1)$$

Acceptance evaluation: The film having a relative crystallization rate of 50% or more was regarded as acceptance.

The DSC used for determination of the crystallization temperature and the relative crystallization rate and the measurement condition were as follows.
Apparatus: DSC 6220 manufactured by SII NanoTechnology Inc.
Conditions: measurement temperature region; from 20° C., 200° C., 0° C., to 200° C.
(That is, first, measurement was carried out in a temperature rise process form 20° C. to 200° C., then in a temperature drop process from 200° C. to 0° C., and finally in a temperature rerise process from 0° C. to 200° C.)
Temperature rise rate/temperature drop rate: 2° C./min
Measurement atmosphere: under a nitrogen atmosphere (200 ml/min)

No exothermic peak associated with the crystallization was observed in the temperature rerise process. Hence, it was judged that 100% of a crystallizable region was crystallized at a temperature rise rate of 2° C./min, and the validity of the equation for the relative crystallization rate was confirmed.

<Heat Deformation Rate>

The heat deformation rate was determined in accordance with the heat deformation test in Japanese Industrial Standard C3005. The measurement apparatus and measurement conditions used are as follows.
Apparatus: Heat deformation tester manufactured by TESTER SANGYO CO., LTD.
Conditions: sample size: 1 mm thickness×25 mm width×40 mm length (films were stacked into a total thickness of 1 mm)
Measurement temperature: 150° C.
Load: 10 N
Measurement time: 30 minutes (the test started without aging considering recrystallization)
Calculation method of heat deformation rate: The thickness T1 before the test and the thickness T2 after the test were determined, and the heat deformation rate was calculated using Equation (2). Comparative Example 2 was not evaluated because it was not removed.

$$\text{Heat deformation rate (\%)} = (T1 - T2)/T1 \times 100 \quad (2)$$

Acceptance evaluation: The film having a heat deformation rate of 40% or less was regarded as acceptance.

<Tear Strength>

The tear strength was determined in accordance with "Paper-Determination of tearing resistance-Elmendorf tearing tester method" in Japanese Industrial Standard P8116. The measurement apparatus and measurement conditions used are as follows.
Apparatus: Elmendorf tear strength tester manufactured by TESTER SANGYO CO., LTD.
Conditions: sample size: about 1 mm thickness×76 mm width×63 mm length (films were stacked into a total thickness of about 1 mm)

The sample was cut out so that the direction parallel to the longitudinal direction would be the machine direction (hereinafter referred to as MD direction) during the film formation.
Calculation method of tear strength: The tear strength was calculated using Equation (3). Comparative Example 2 was not evaluated because it was not removed.

$$T = (A \times p)/(n \times t \times 1000) \quad (3)$$

T: tear strength (N/mm)
A: measured value (mN)
p: the number of test pieces to be the standard for pendulum scale (16 in this apparatus)
n: the number of test pieces that are simultaneously torn
t: average thickness (mm) per test piece Acceptance evaluation: The film having a tear strength of 2.7 N/mm or more that was the tear strength of the film without a flame retardant in Comparative Example 1 was regarded as acceptance.

<Flame-Retardant Test (UL-94 VTM)>

The flame-retardant test was carried out in accordance with UL94 VTM test method (vertical flame test for thin materials). Comparative Example 2 was not evaluated because it was not removed.
Acceptance evaluation: The film satisfying the VTM-0 standard was regarded as acceptance.

<Acceptance Evaluation>

The film satisfying the acceptance standards of the tear strength and the flame-retardant test (UL-94 VTM) was regarded as B, the film satisfying the acceptance standards of all evaluations was regarded as A, and the film not satisfying at least one of the acceptance standards of the tear strength and the flame-retardant test (UL-94 VTM) was regarded as C, for the acceptance evaluation.

Each evaluation result of Examples 1 to 10 and Comparative Examples 1 to 5 is shown in Table 2 and Table 3.

TABLE 1

| Material name | A1 | B1 | B2 | B' | C1 | C2 | D1 | D2 | D' | E1 |
|---|---|---|---|---|---|---|---|---|---|---|
| Example 1 | 100 | 2.0 | — | — | 3.0 | — | — | 20 | — | — |
| Example 2 | 100 | — | 3.0 | — | — | 6.0 | — | 60 | — | 4.0 |
| Example 3 | 100 | — | 1.0 | — | — | 5.0 | 30 | — | — | — |
| Example 4 | 100 | 4.0 | — | — | — | 9.0 | — | 50 | — | 1.0 |
| Example 5 | 100 | — | 0.5 | — | 1.0 | — | 15 | — | — | 2.0 |
| Example 6 | 100 | — | 1.0 | — | — | 5.0 | — | 35 | — | — |
| Example 7 | 100 | 3.0 | — | — | — | 12.0 | — | 40 | — | — |
| Example 8 | 100 | — | 7.0 | — | — | 2.0 | 30 | — | — | — |
| Example 9 | 100 | 1.0 | — | — | 4.0 | — | — | 30 | — | — |
| Example 10 | 100 | — | 1.0 | — | 2.0 | — | 70 | — | — | — |
| Comparative Example 1 | 100 | — | 2.0 | — | — | 3.0 | — | — | — | — |
| Comparative Example 2 | 100 | — | — | 3.0 | — | 2.0 | 20 | — | — | 1.0 |
| Comparative Example 3 | 100 | — | 1.0 | — | — | — | — | 25 | — | — |
| Comparative Example 4 | 100 | — | 3.0 | — | — | 4.0 | — | — | 30 | — |
| Comparative Example 5 | 100 | — | 2.0 | — | — | 2.0 | 5 | — | — | — |

Unit: part by weight

TABLE 2

| Evaluation | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Film thickness (μm) | | 100 | 100 | 100 | 100 | 100 | 100 | 100 | 100 | 100 | 100 |
| DSC data for resin | Melting temperature | 167 | 160 | 164 | 162 | 167 | 164 | 162 | 165 | 164 | 160 |

TABLE 2-continued

| Evaluation | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| composition (° C.) | Crystallization temperature | 119 | 125 | 117 | 126 | 129 | 117 | 118 | 119 | 118 | 117 |
| Setting temperature (° C.) | Resin temperature during melt film formation | 150 | 150 | 150 | 155 | 175 | 155 | 155 | 155 | 170 | 150 |
| | Crystallization acceleration temperature | 120 | 125 | 115 | 125 | 130 | 100 | 115 | 120 | 150 | 115 |
| Film formability result | Plate out to roll | A | A | A | A | A | A | A | B | A | A |
| | Releasability | Good | Good | Good | Good | Good | Good | Good | Good | Good | Good |
| | Film surface condition | A | A | A | A | A | A | B | A | A | A |
| Relative crystallization rate (%) | | 81 | 88 | 76 | 84 | 71 | 57 | 83 | 87 | 35 | 47 |
| Heat deformation rate (%) | | 7 | 34 | 24 | 37 | 19 | 39 | 10 | 7 | 55 | 71 |
| Tear strength (N/mm) | | 3.3 | 3.6 | 3.0 | 3.5 | 3.2 | 3.1 | 2.9 | 2.8 | 3.5 | 3.8 |
| UL-94 VTM | | VTM-0 | VTM-0 | VTM-0 | VTM-0 | VTM-0 | VTM-0 | VTM-0 | VTM-0 | VTM-0 | VTM-0 |
| Acceptance evaluation | | A | A | A | A | A | A | B | B | B | B |

TABLE 3

| Evaluation | | Comparative Example 1 | Comparative Example 2 | Comparative Example 3 | Comparative Example 4 | Comparative Example 5 |
|---|---|---|---|---|---|---|
| Film thickness (μm) | | 100 | — | 100 | 100 | 100 |
| DSC data for resin composition (° C.) | Melting temperature | 167 | 165 | 165 | 167 | 167 |
| | Crystallization temperature | 120 | 129 | 116 | 120 | 120 |
| Setting temperature (° C.) | Resin temperature during melt film formation | 155 | 145 | 140 | 160 | 155 |
| | Crystallization acceleration temperature | 120 | 130 | 115 | 120 | 120 |
| Film formability result | Plate out to roll | A | C | A | A | A |
| | Releasability | Good | Not removed | Poor | Good | Good |
| | Film surface condition | A | — | C | A | A |
| Relative crystallization rate (%) | | 92 | — | 32 | 87 | 87 |
| Heat deformation rate (%) | | 2 | — | 61 | 3 | 7 |
| Tear strength (N/mm) | | 2.7 | — | 2.4 | 1.6 | 2.8 |
| UL-94 VTM | | NG | — | VTM-0 | VTM-0 | VTM-2 |
| Acceptance evaluation | | C | C | C | C | C |

The evaluation results shown in Table 2 and Table 3 ascertained that each film of Examples 1 to 10 of the present invention had excellent flame retardancy and a high tear strength. It was also ascertained that each film of Examples 1 to 8 in which the roll setting temperature and the amount of a flame retardant were optimized had a high relative crystallization rate and a suppressed heat deformation rate. Each film of Examples 1 to 6 in which the amount of the acidic functional group-modified olefinic polymer and the amount of the tetrafluoroethylene polymer were also optimized had good releasability and a good film surface condition and did not cause the plate out to a roll.

In contrast, each film of Comparative Examples 1 to 5 that did not include the components or did not have the compounding ratio of the present invention did not satisfy all the desired flame retardancy and tear strength, and the total acceptance evaluation was C.

INDUSTRIAL APPLICABILITY

According to the present invention, a poly lactic acid-containing film or sheet having excellent flame retardancy, heat resistance, and roll lubricity is provided while maintaining the original mechanical properties (for example, breaking strength and tear strength) of poly lactic acid.

REFERENCE SIGNS LIST

1 First roll
2 Second roll
3 Third roll
4 Fourth roll
5 Take off roll
6 Cool roll
7 Cool roll
8 Resin composition
9 Bank (resin puddle)

The invention claimed is:

1. A pressure-sensitive adhesive film or sheet comprising a film or sheet as a base material, wherein the film or sheet is composed of a resin composition which comprises:

a poly lactic acid (A);

an acidic functional group-modified olefinic polymer (B) including an acidic functional group and having an acid value of 10 to 70 mg KOH/g and a weight average molecular weight of 10,000 to 80,000;

a tetrafluoroethylene polymer (C); and an aromatic-condensed phosphoric acid ester-containing flame retardant (D) including a compound of General Formula (I), the aromatic-condensed phosphoric acid ester-containing flame retardant (D) being included in an amount of 10 to 80 parts by weight based on 100 parts by weight of the poly lactic acid (A),

[Formula 1]

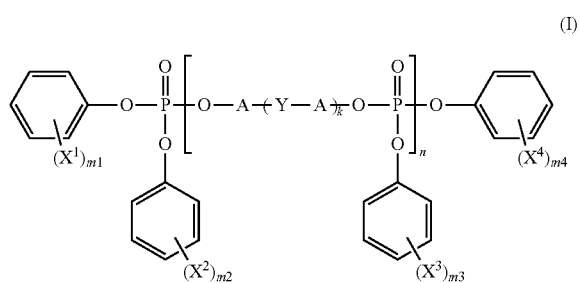

where each A is independently an arylene group having 6 to 18 carbon atoms;
each Y is independently a single bond or an alkylene group having 1 to 6 carbon atoms;
each of $X^1$ to $X^4$ is independently an alkyl group having 1 to 14 carbon atoms, an aryl group having 6 to 18 carbon atoms, an alkoxy group having 1 to 8 carbon atoms, or an aryloxy group having 6 to 18 carbon atoms;
k is an integer of 0 to 2;
each of m1 to m4 is independently an integer of 0 to 4; and
n is an integer of 1 to 5,
the film or sheet having a thickness of 10 to 500 μm.

2. The pressure-sensitive adhesive film or sheet according to claim 1, wherein the acidic functional group included in the acidic functional group-modified olefinic polymer (B) is a carboxylic acid anhydride group.

3. The pressure-sensitive adhesive film or sheet according to claim 1, wherein the tetrafluoroethylene polymer (C) is included in an amount of 0.5 to 15.0 parts by weight based on 100 parts by weight of the poly lactic acid (A).

4. The pressure-sensitive adhesive film or sheet according to claim 1, wherein the acidic functional group-modified olefinic polymer (B) is included in an amount of 0.1 to 10.0 parts by weight based on 100 parts by weight of the poly lactic acid (A).

5. The pressure-sensitive adhesive film or sheet according to claim 1, wherein the resin composition further includes a crystallization accelerator (E), and the crystallization accelerator (E) is included in an amount of 0.1 to 5.0 parts by weight based on 100 parts by weight of the poly lactic acid (A).

6. The pressure-sensitive adhesive film or sheet according to claim 1 having a thickness of 10 to 500 μm, satisfying a flame-retardant standard of UL94 VTM-0, and having a tear strength of 2.7 N/mm or more.

7. The pressure-sensitive adhesive film or sheet according to claim 1 having a deformation rate of 40% or less under a load of 10 N for 30 minutes in a temperature environment of 150° C. in accordance with heat deformation test in Japanese Industrial Standard C3005, and having a relative crystallization rate of 50% or more calculated from Equation (1), Relative crystallization rate (%)=$(\Delta Hm - \Delta Hc)/\Delta Hm \times 100$ (1)

where $\Delta Hc$ is an amount of heat of an exothermic peak associated with crystallization of the film or sheet in a temperature rise process after film formation, and $\Delta Hm$ is an amount of heat associated with melting.

8. A method for manufacturing the pressure-sensitive adhesive film or sheet according to claim 1, the method comprising forming a film from a resin composition by melt film formation,
the resin composition during the melt film formation having a temperature between a temperature 15° C. higher than a crystallization temperature (Tc) of the resin composition and a temperature 5° C. lower than a melting temperature (Tm) or
the melt film formed resin composition being cooled and solidified after a crystallization acceleration which is controlled between a temperature 25° C. lower than a crystallization temperature (Tc) of the resin composition and a temperature 10° C. higher than the crystallization temperature (Tc),
wherein the Tc is as the exothermic peak temperature associated with the crystallization of the resin composition in a temperature drop process after film formation which is determined by DSC, and
wherein the Tm is as the endothermic peak temperature associated with the melting of the resin composition in a temperature rerise process after film formation which is determined by DSC.

9. A method for manufacturing the pressure-sensitive adhesive film or sheet according to claim 1, the method comprising forming a film from a resin composition by melt film formation,
the resin composition during the melt film formation having a temperature between a temperature 15° C. higher than a crystallization temperature (Tc) of the resin composition and a temperature 5° C. lower than a melting temperature (Tm) and
the melt film formed resin composition being cooled and solidified after a crystallization acceleration which is controlled between a temperature 25° C. lower than a crystallization temperature (Tc) of the resin composition and a temperature 10° C. higher than the crystallization temperature (Tc),
wherein the Tc is as the exothermic peak temperature associated with the crystallization of the resin composition in a temperature drop process after film formation which is determined by DSC, and
wherein the Tm is as the endothermic peak temperature associated with the melting of the resin composition in a temperature rerise process after film formation which is determined by DSC.

10. The method for manufacturing the pressure-sensitive adhesive film or sheet according to claim 8, wherein the melt film formation of comprises forming a film having a desired thickness by passing the melted resin composition through a space between two metal rolls.

11. The method for manufacturing the pressure-sensitive adhesive film or sheet according to claim 8, wherein the crystallization acceleration comprises bringing the melt film formed resin composition into contact with a metal roll having a predetermined surface temperature.

* * * * *